United States Patent
Shartzer et al.

(10) Patent No.: US 9,582,535 B2
(45) Date of Patent: Feb. 28, 2017

(54) MEDIA ASSET USAGE DATA REPORTING THAT INDICATES CORRESPONDING CONTENT CREATOR

(75) Inventors: Lee Douglas Shartzer, Valencia, CA (US); Kenneth Alan Rudman, South Pasadena, CA (US); Dan Han Diep, San Gabriel, CA (US); Samir M. Ahmed, Glendale, CA (US); James Earl Booth, Jr., Burbank, CA (US); Basil Badawiyeh, Santa Clarita, CA (US)

(73) Assignee: Thomson Licensing (FR)

( * ) Notice: Subject to any disclaimer, the term of this patent is extended or adjusted under 35 U.S.C. 154(b) by 191 days.

(21) Appl. No.: 13/978,105

(22) PCT Filed: Jan. 4, 2012

(86) PCT No.: PCT/US2012/020119
§ 371 (c)(1),
(2), (4) Date: Nov. 19, 2013

(87) PCT Pub. No.: WO2012/094352
PCT Pub. Date: Jul. 12, 2012

(65) Prior Publication Data
US 2014/0067855 A1    Mar. 6, 2014

Related U.S. Application Data

(60) Provisional application No. 61/429,714, filed on Jan. 4, 2011.

(51) Int. Cl.
*G06F 7/00* (2006.01)
*G06F 17/30* (2006.01)
(Continued)

(52) U.S. Cl.
CPC .... *G06F 17/30424* (2013.01); *G06F 11/3438* (2013.01); *G06F 17/3082* (2013.01);
(Continued)

(58) Field of Classification Search
None
See application file for complete search history.

(56) References Cited

U.S. PATENT DOCUMENTS 7,200,586 B1    4/2007 Deguchi et al.
2002/0133393 A1    9/2002 Tatsumi et al.
(Continued)

FOREIGN PATENT DOCUMENTS

CN    1497876    5/2004
CN    1653819    8/2005
(Continued)

OTHER PUBLICATIONS

International Search Report dated Mar. 20, 2012.

*Primary Examiner* — Uyen Le
(74) *Attorney, Agent, or Firm* — Jack Schwartz & Associates, PLLC

(57) ABSTRACT

The disclosure is related to the idea of tracking user navigation, consumption, and/or behavior and applying analytics to help shape future offerings (customized offerings, up-sells, recommendations, etc.) to a user and to provide reporting data to service providers and studios. Methods and systems of providing viewing recommendations for a user are set forth. This involves collecting usage data related to a session of interaction by the user, processing the user data for the session, and providing feedback regarding the session. The sessions involve multiple stages tracking a user's interactions. These include stages such as an inquiry stage, a results stage, a details stage, a selection stage, and a confirmation stage. Usage data is then mined to indicate the
(Continued)

content creator of a media asset regardless of the media asset type.

27 Claims, 11 Drawing Sheets

(51) Int. Cl.
    *G06F 11/34* (2006.01)
    *H04H 60/31* (2008.01)
    *H04H 60/44* (2008.01)
    *H04H 60/64* (2008.01)
(52) U.S. Cl.
    CPC ....... *G06F 17/30752* (2013.01); *H04H 60/31* (2013.01); *H04H 60/44* (2013.01); *H04H 60/64* (2013.01)

(56) References Cited

U.S. PATENT DOCUMENTS

| | | | |
|---|---|---|---|
| 2003/0067554 A1* | 4/2003 | Klarfeld | G11B 27/105 348/461 |
| 2004/0073951 A1 | 4/2004 | Bae et al. | |
| 2006/0282283 A1* | 12/2006 | Monahan | 705/1 |
| 2006/0293957 A1 | 12/2006 | Petersen et al. | |
| 2007/0220575 A1* | 9/2007 | Cooper | H04N 7/1675 725/118 |
| 2009/0019488 A1 | 1/2009 | Ruiz-Velasco et al. | |
| 2009/0055385 A1 | 2/2009 | Jeon et al. | |
| 2009/0248672 A1 | 10/2009 | McIntire et al. | |
| 2009/0254943 A1 | 10/2009 | Maynard et al. | |
| 2010/0016011 A1 | 1/2010 | Alen | |
| 2010/0107090 A1 | 4/2010 | Hearst et al. | |
| 2010/0192175 A1 | 7/2010 | Bachet et al. | |
| 2010/0217721 A1 | 8/2010 | Wormald et al. | |
| 2011/0035287 A1* | 2/2011 | Fox | 705/14.69 |
| 2012/0036139 A1 | 2/2012 | Okamoto et al. | |

FOREIGN PATENT DOCUMENTS

| | | |
|---|---|---|
| JP | 2000132566 | 5/2000 |
| JP | 2001125914 | 5/2001 |
| JP | 200274021 | 3/2002 |
| JP | 2002132800 | 5/2002 |
| JP | 2002185417 | 6/2002 |
| JP | 2002335517 | 11/2002 |
| JP | 2002344933 | 11/2002 |
| JP | 2003271831 | 9/2003 |
| JP | 2005275740 | 10/2005 |
| JP | 2006314072 | 11/2006 |
| JP | 2006340396 | 12/2006 |
| JP | 2008299681 | 12/2008 |
| JP | 2008547136 | 12/2008 |
| JP | 2010239571 | 10/2010 |
| JP | 2010537578 | 12/2010 |
| WO | WO2009038829 | 3/2009 |

* cited by examiner

MEDIA ASSET USAGE DATA REPORTING THAT INDICATES CORRESPONDING CONTENT CREATOR

CROSS REFERENCE TO RELATED APPLICATIONS

This application claims the benefit, under 35 U.S.C. §365 of International Application PCT/US12/20119, filed Jan. 4, 2012 which was published in accordance with PCT Article 21(2) on Jul. 12, 2012 in English and which claims the benefit of U.S. provisional patent application No. 61/429,714, filed Jan. 4, 2011.

TECHNICAL FIELD

The present disclosure generally relates to reporting usage data, and more particularly the gathering of user data feedback to improve reporting usage data regardless of media type for a content creator.

BACKGROUND

Traditional usage tracking on media devices tends to focus on the resulting content selection from a limited number of sources. These systems do not track the process of how the selected content was arrived at.

For example, the Nielsen rating system just tracks what broadcast television shows are being watched. One limitations of this type of system is that it doesn't track or otherwise account for other types of media (DVR recordings, VOD selections, internet content, etc) that may be selected and/or viewed in place of broadcast television. Another limitations is that is does not provide any insight as to how or why particular content is selected and/or viewed.

Additionally, current rating systems are not capable of tracking all of the different types of content that are available from a content creator. A content creator can be a media entity that creates different types of media. For example, the Disney Corporation and Vivendi create movies, video games, television shows, radio shows, music albums, and the like, which represent different types of media. Currently though, there is no way of tracking how much content a user consumes from Disney versus a content creator such as Vivendi SA.

SUMMARY

The disclosure is directed towards tracking user navigation, consumption, and/or behavior and applying analytics to help shape future offerings (customized offerings, upselling, recommendations, etc.) to a user and to provide reporting data that groups media assets according to a content creator regardless of the type of media that is consumed.

In accordance with one embodiment, a method of providing viewing recommendations for a user is provided. The method comprises collecting usage data related to a session of interaction by the user, processing the user data for the session, and providing feedback regarding the session. In certain embodiments the session comprises an inquiry stage, a results stage, a details stage, a selection stage, and a confirmation stage.

DETAILED DESCRIPTION

Figure 1:
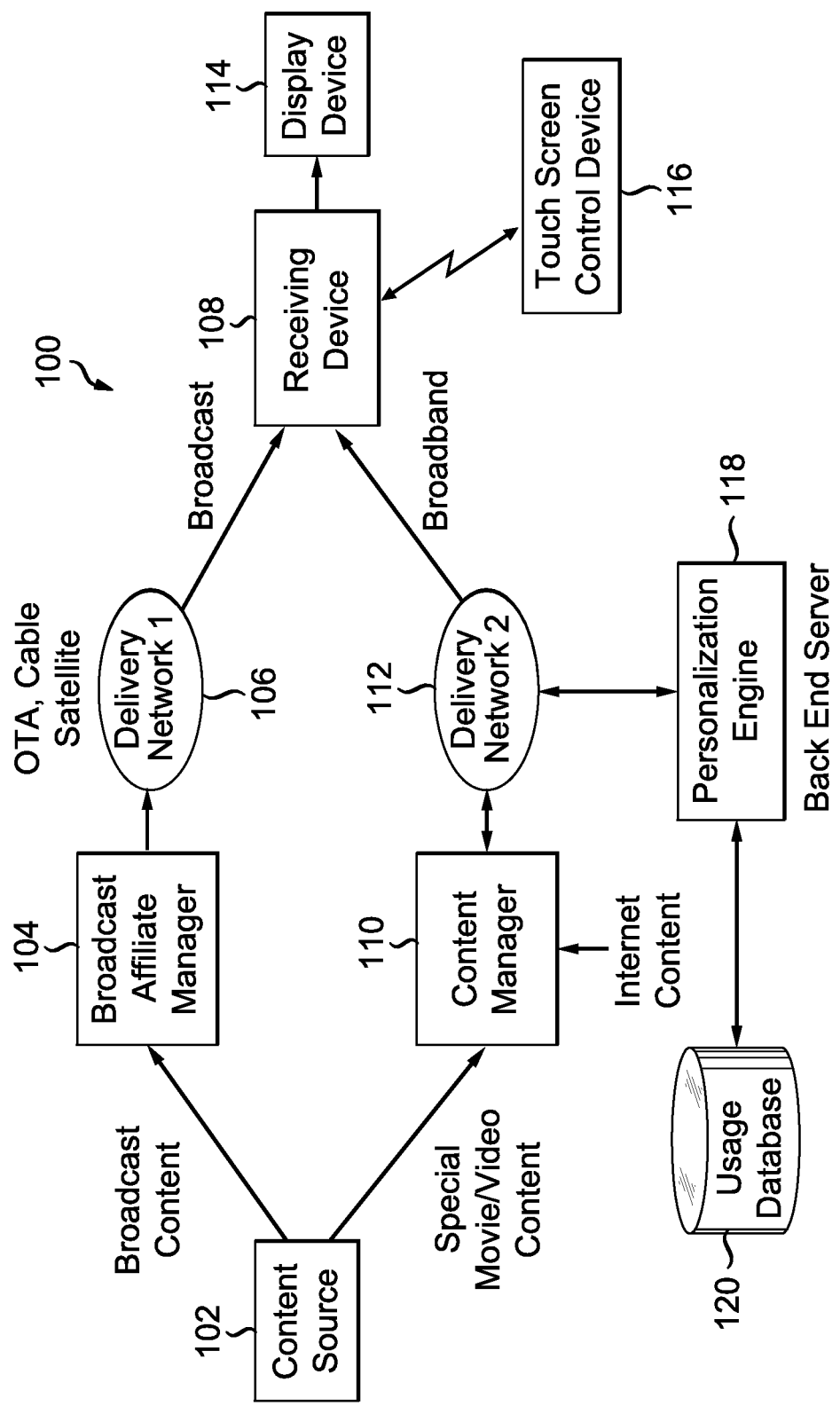
FIG. 1 is a system diagram outlining the delivery of video and audio content to the home in accordance with one embodiment.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box, digital video recorder (DVR), a gateway, a modem, etc. Further, the receiving device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display.

The receiving device 108 may also be interfaced to a second screen such as a touch screen control device 116. The touch screen control device 116 may be adapted to provide user control for the receiving device 108 and/or the display device 114. The touch screen device 116 may also be capable of displaying video content. The video content may be graphics entries, such as user interface entries, or may be a portion of the video content that is delivered to the display device 114. The touch screen control device 116 may interface to receiving device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below. The receiving device 108 and touch screen control device 116 may make up a front end.

In the example of FIG. 1, the system 100 also includes a back end including a server 118 and a usage database 120. The back end server 118 includes a personalization engine that analyzes the usage habits of a user and makes recommendations based on those usage habits. The usage database 120 is where the usage habits for a user are stored. In some cases, the usage database 120 may be part of the back end server 118 a. In the present example, the back end server 118 (as well as the usage database 120) is connected to the system the system 100 and accessed through the delivery network 2 (112).

Figure 2:
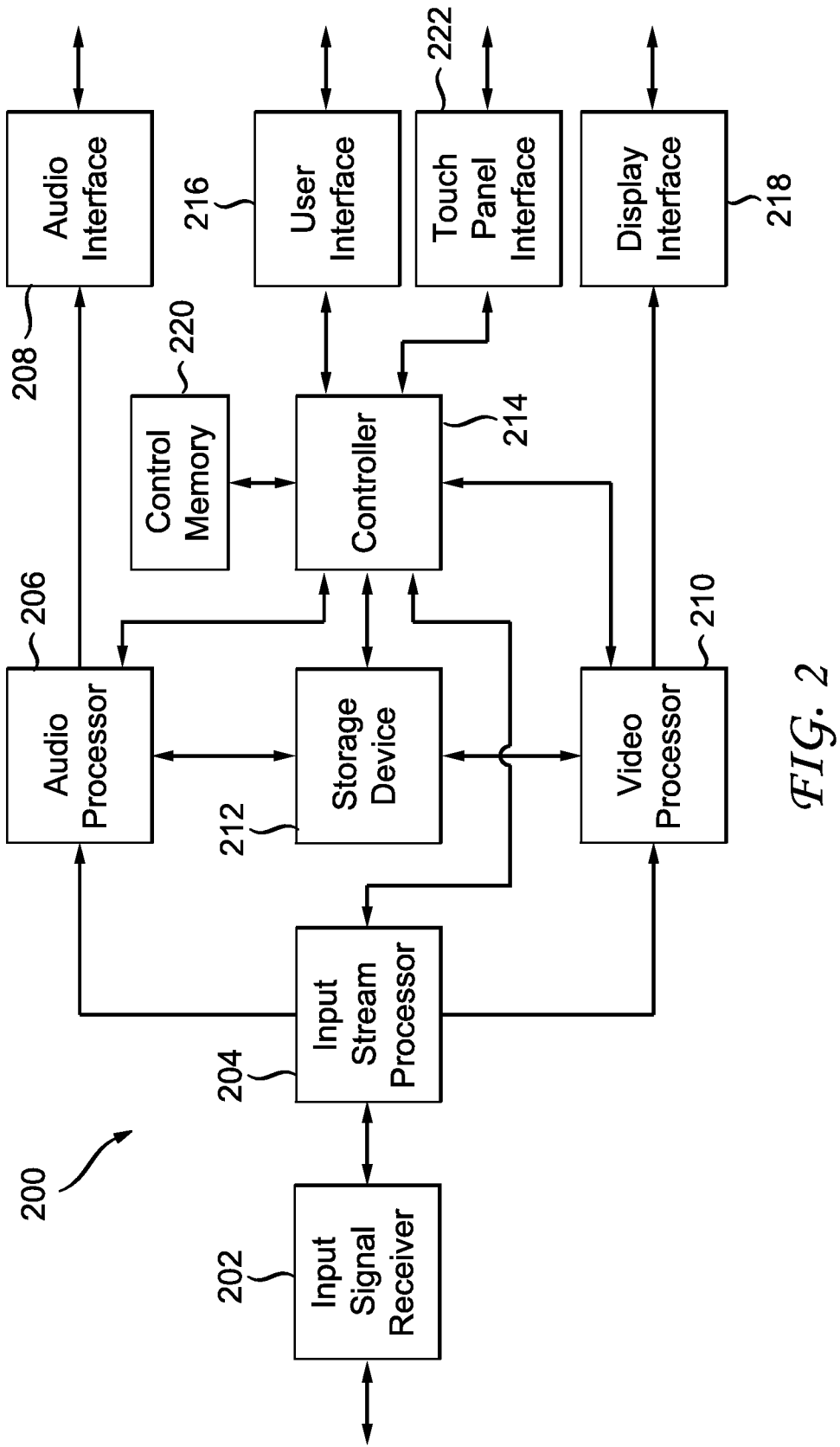
FIG. 2 is system diagram showing further detail of a representative set top box receiver.

Turning now to FIG. 2, a block diagram of an embodiment of a receiving device 200 is shown. Receiving device 200 may operate similar to the receiving device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content. The database may be stored as a pattern of graphic elements. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Figure 3:
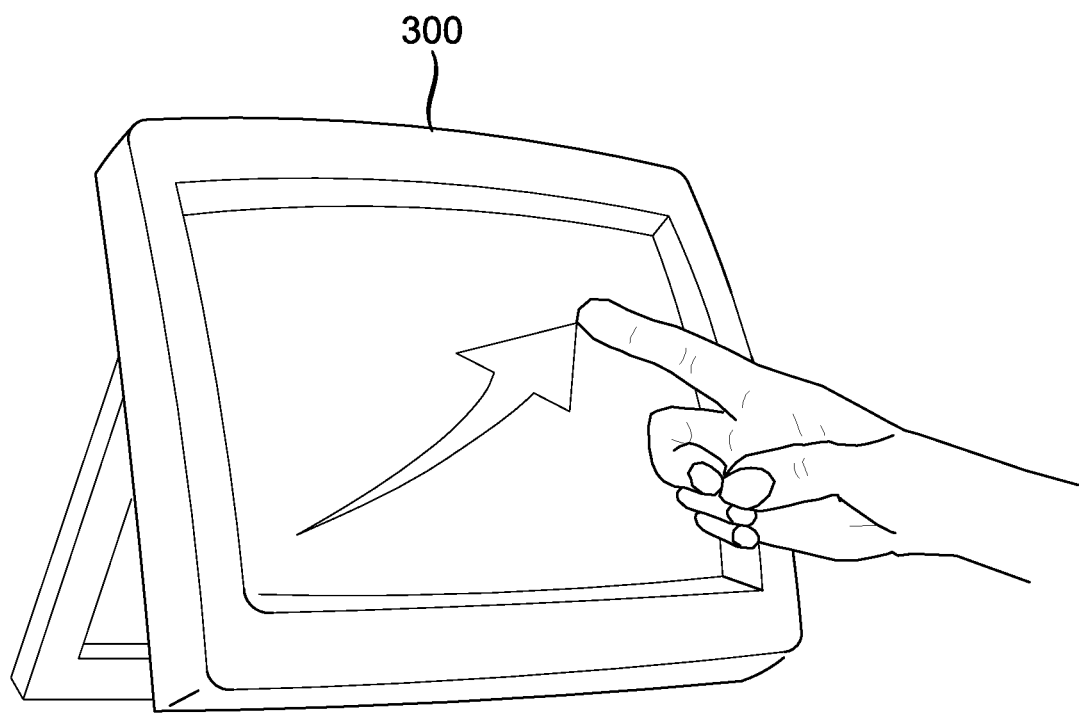
FIG. 3 is a diagram depicting a touch panel control device in accordance with one embodiment.

The user interface process of the present disclosure employs an input device that can be used to express functions, such as fast forward, rewind, etc. To allow for this, a touch panel device 300 may be interfaced via the user interface 216 and/or touch panel interface 222 of the receiving device 200, as shown in FIG. 3. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the gird display. In other embodiments, the touch panel 300 will additionally serve as the display device allowing the user to more directly interact with the navigation through the grid display of content. The touch panel device may be included as part of a remote control device containing more conventional control functions such as activator or actuator buttons. The touch panel 300 can also include at least one camera element.

Figure 4:
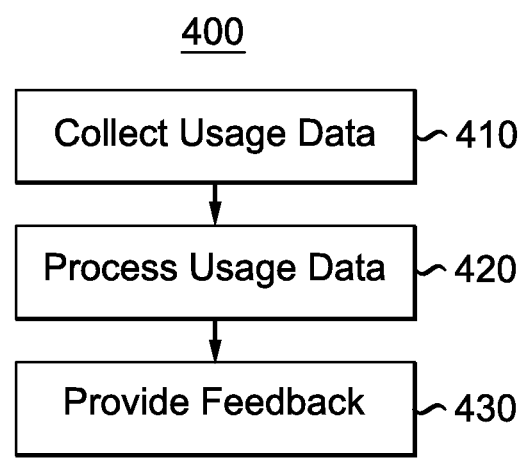
FIG. 4 is a flow diagram depicting an exemplary process in accordance with one embodiment.

FIG. 4 depicts a flow diagram 400 of the process involved in providing user data feedback as described in this disclosure. The process involves collecting or obtaining usage data (step 410), processing the usage data (step 420), and providing feedback (step 430). Each of these steps will be discussed in more detail below.

Pursuant to the first step of FIG. 4, data regarding the usage habits of a user is collected. The usage information can include information collected at the front end from the receiving device 108 and the touch screen control device 116. The type of information collected my include channels watched on the display device 114, the time the channels where watched, how long the channel was watched, the type of program on the channel, information about the program watched (e.g. genre, director, actor, etc.). what was viewed on the touch screen control device 116 (i.e. program guide, additional program information, websites, applications, etc.), what time content was viewed on the touch screen control device 116, how long the content was viewed, and information about the content watched (type of content, genre, etc.).

There are other types of data and behaviors that can be tracked as well. For example, a subscriber's migratory behavior can be tracked from media source to media source and from media asset to media asset. Consider an example, where a user is watching a television program delivered from a network service provider such as Comcast. The user then changes their media selection to an over the top (OTT) media service provider (such as Netflix). The described system can tracks the two media selections (television show, movie) the source of such media selections (Comcast, Netflix, and the like), and the time spent using or watching each media selection. The described system can also track the content author of a media asset through both implicit and explicit techniques as disclosed in various exemplary embodiments.

This current example provides meaningful information since many network service providers, over the top services, personal media servers, broadcast sources, cable sources, satellite sources, IPTV sources, websites, on-line sources that supply media (such as Amazon, Emusic, ITunes, and the like), value keeping track of:

a. What sources exist for a particular media selection.
  b. Tracking what source the media selection comes from.
  c. Tracking whether a media source that is accessed, was suggested by the system.
  d. Tracking whether a user purchases a media selection from a specific source (clickthrough).
  e. Tracking if a user went to a particular source to look at a media selection that was selected, but was not purchased.
  f. Tracking the amount of time a user accessing or watching a media selection from a particular source.
  g. Tracking whether a user is responsive to a particular advertisement and the source of such an advertisement (local operator, network operator, over the top service, broadcaster, etc.).
  h. Tracking what version of a particular media asset was selected, and the source.
  i. Low v. High Resolution such as Standard Definition versus High Definition.
  j. Bit-rate of the Media Asset.
  k. Regular Version v. Special Features.
  l. How long were the "Special Features" accessed.
  m. Whether advertisements embedded or pushed into the media asset are selected.
  n. Keeping track of what application was used for selecting a media asset, and for how long it took to get to a particular media asset.
  o. Search Engine.
  p. Electronic Program Guide.
  q. Advertisement.
  r. Social Networking Recommendation from a Friend.
  s. Tracking a Content Creator of a Media Asset.

Figure 5:
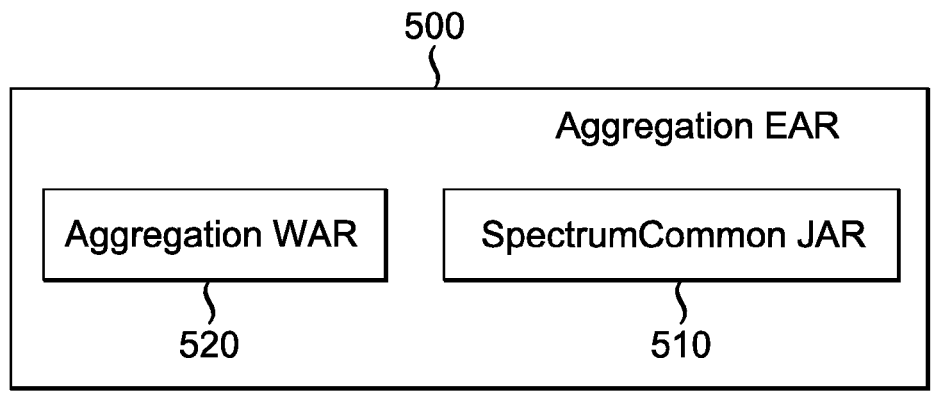
FIG. 5 is a system diagram depicting an aggregator system in accordance with one embodiment.

It is expected that other attributes can be tracked as well and delivered in a report, where such attributes can be group together. This information may be collected and aggregated by an Aggregator system such as seen in FIG. 5.

The Aggregation EAR file 500 contains both Spectrum-Common JAR module 510 and Aggregation WAR module 520. The SpectrumCommon module JAR 510 is a shared module to obtain errors codes, error messages and logging services. Aggregation module 520 is an internal API to aggregate the collected customer usage data on device and later the gathered logs are used for reporting. Aggregated user data can then be sent to and saved in the database 120 and used for report generation.

Examples of properties recorded for user activity logging include: Timestamp, Household ID, User ID, Device ID, Session ID, Application ID, Action Type, as well as other parameters associated with the Action Type. This information is provided in log messages having the format:

<Timestamp>|<HouseholdId>|<UserId>|<DeviceId>|<SessionId>|<ApplicationId>|<ActionType>|<MsgParams> where:
- <Timestamp> format is "yyyy-mm-dd hh:mi:ss.millis"
- <ActionType> is one of the values in the RP_ACTION_TYPE table (see Database Schema Design section for values)
- <MsgParams> are message specific key value pairs delimited by a ";" character. Key value pairs are delimited by a ":" character.

An example of such a log message for an acquire action would look as follows:
ACQUIRE Log Message
2010-10-12 16:52:12.014|Household123|be01|dev456|Sess123|App001|ACQUIRE|ITEM_ID:987;ITEM_TYPE:VOD;OFFER_ID:Offer123;PROVIDER:NETFLIX;ACQUIRE_SOURCE:SEARCH;ACQUIRE_TYPE:BUY;PRICE:7.99;CURRENCY:USD;STATUS:SUCCESS;

The aggregation module provides log messages in response to a request such as:
CollectUserData
  Request: List of log messages
  Response: Boolean true value (even if web service processing failure)

The web service request is parsed to extract individual log messages. Each individual log message is parsed to extract user information, device information, activity type, and key value pairs of activity type specific data. Each key value pair of data is stored in a database table. The current implementation processes and parses all the log record data in each web service request before returning the web service response.

Database Schema Design

The reporting database schema design will be based on a modified Entity-Attribute-Value (EAV) model also known as "sparse matrix". This model will store each log message attribute value pair as a separate row in another table. This approach involves minor changes to the existing reporting database schema such as removing OFFER_ID and CONTENT_ID columns from the RP_LOG table.

| RP_LOG TABLE | |
|---|---|
| LOG_ID | NUMBER |
| LOG_DATE | TIMESTAMP |
| HOUSEHOLD_ID | VARCHAR2 (20 CHAR) |
| USER_ID | VARCHAR2 (20 CHAR) |

-continued

| RP_LOG TABLE | |
|---|---|
| DEVICE_ID | VARCHAR2 (20 CHAR) |
| SERVICE_ID | VARCHAR2 (20 CHAR) |
| SESSION_ID | NUMBER |
| ACTION_TYPE_ID | NUMBER (FK to RP_ACTION_TYPE table) |

The OFFER_ID and CONTENT_ID columns have been removed since they are only used for ACQUIRE messages. These attributes will be added to the RP_INFORMATION table.

| RP_LOG_INFORMATION TABLE | |
|---|---|
| LOG_ID | NUMBER (FK to RP_LOG table) |
| INFORMATION_ID | NUMBER (FK to RP_INFORMATION table) |
| LOG_INFORMATION_VALUE | VARCHAR2 (512 CHAR) |

| RP_INFORMATION TABLE | |
|---|---|
| INFORMATION_ID | NUMBER |
| INFORMATION_NAME | VARCHAR2 (20 CHAR) |
| INFORMATION_DEFINITION | VARCHAR2 (200 CHAR) |

This table should contain records for all the key parameters (ID and names)

| INFORMATION_ID | INFORMATION_NAME | INFORMATION_DEFINITION |
|---|---|---|
| 0 | UNKNOWN | Unknown |
| 1 | APPLICATION_ID | Application ID |
| 2 | ITEM_ID | Item ID |
| 3 | ITEM_TYPE | Item type |
| 4 | OFFER_ID | Offer ID |
| 5 | ACQUIRE_SOURCE | Acquire source (SEARCH/RECOMMEND) |
| 6 | ACQUIRE_TYPE | Acquire type (BUY/RENT) |
| 7 | PRICE | Acquire price |
| 8 | CURRENCY_TYPE | Currency type |
| 9 | STATUS | Status (SUCCESS/FAIL/CANCEL) |
| 10 | SEARCH_CRITERIA | Search criteria |
| 11 | FRIEND_ID | Friend ID |
| 12 | FRIEND_ACTION | Friend action (ADD/DELETE/ACCEPT_INVITE/SEND_INVITE/SEARCH) |
| 13 | CONTENT_POSITION | Content position (HH:MI:SS format) |
| 14 | DEVICE_TYPE | Device type (TABLET/TV) |
| 15 | CHANNEL_ID | Channel ID |
| 16 | UNKNOWN_INFO | Unknown info |
| 17 | DVR_ACTION | DVR action (DELETE/SAVE_UNTIL) |
| 18 | FILE_DOWNLOAD | 3rd party application download info |
| 19 | PROVIDER_ID | Provider ID (YOUTUBE, NETFLIX, NSP) |
| 20 | CREATOR_ID | The content creator of a particular media asset which can be a specific movie studio, broadcaster, game publisher, and the like. |

| RP_ACTION_TYPE TABLE | |
| --- | --- |
| ACTION_TYPE_ID | NUMBER |
| ACTION_TYPE | VARCHAR2 (20 CHAR) |

This table should contain records for all the activity names such as ACQUIRE, SEARCH, VIEWCHANNEL, PLAY, FASTFORWARD, REVERSE, PAUSE, etc. Additional action names are TBD.

| ACTION_TYPE_ID | ACTION_TYPE |
| --- | --- |
| 0 | UNKNOWN |
| 1 | APPLICATION_START |
| 2 | APPLICATION_END |
| 3 | SCREENSAVER_START |
| 4 | SCREENSAVER_END |
| 5 | ACQUIRE |
| 6 | SEARCH |
| 7 | SHARE |
| 8 | MANAGE_FRIEND |
| 9 | MANAGE_LIBRARY |
| 10 | MIRROR |
| 11 | PLAY |
| 12 | PAUSE |
| 13 | FASTFORWARD |
| 14 | REVERSE |
| 15 | STOP |
| 16 | VIEW_TV_START |
| 17 | VIEW_TV_END |
| 18 | MANAGE_DVR_RECORDING |
| 19 | USER_ACTION |
| 20 | FILE_DOWNLOAD |

| RP_APPLICATION TABLE | |
| --- | --- |
| APP_ID | NUMBER |
| APP_DESCRIPTION | VARCHAR2 (20 CHAR) |

Figure 6:
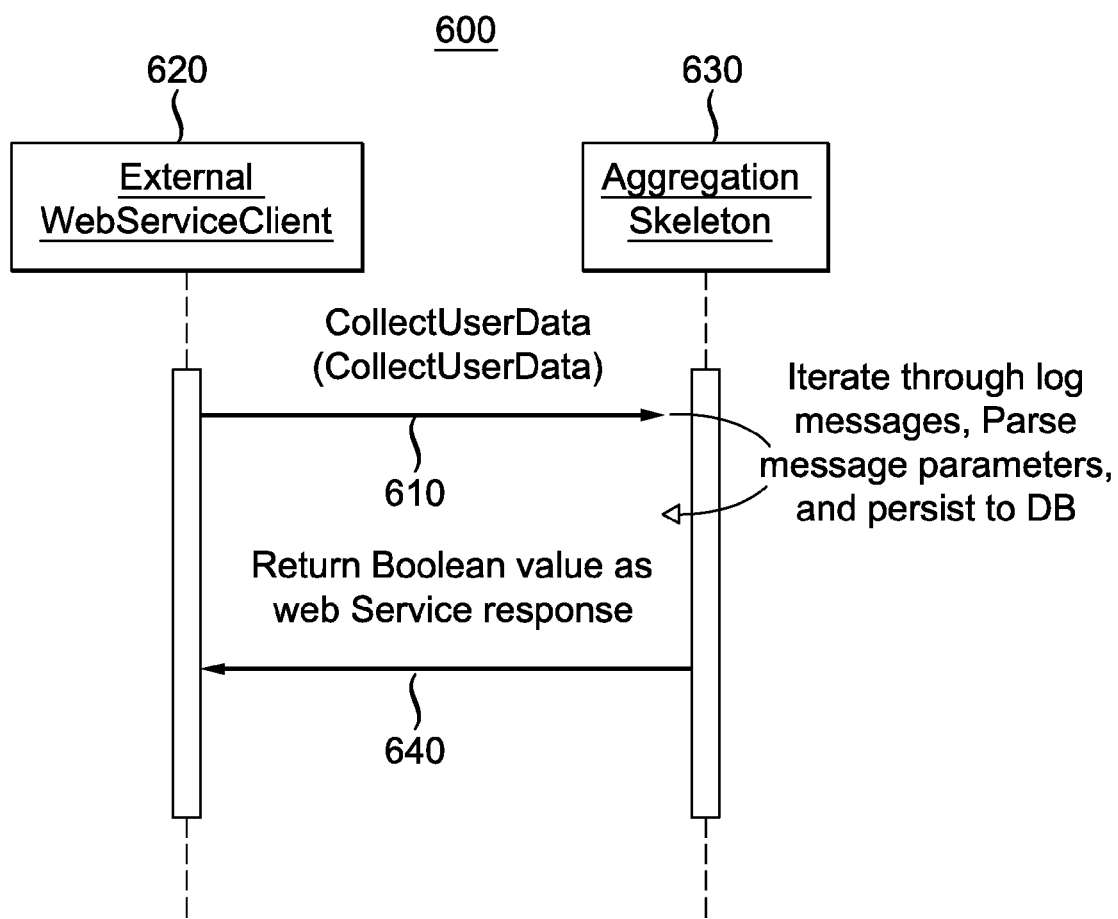
FIG. 6 is a flow diagram depicting an exemplary process in accordance with one embodiment.

FIG. 6 depicts the collection of user activity data by aggregation system using the CollecUserData operation 600. Here the request 610 is made by an External Web Service client 620, which can be located at back end server 118. The request is received by the aggregation skeleton 620 of the aggregation module which is located on receiving device 108 or the second screen 116. The aggregation skeleton 630 responds with a Boolean Value 640. An example of interworkings of the aggregation module can be seen in FIG. 7.

Figure 7:
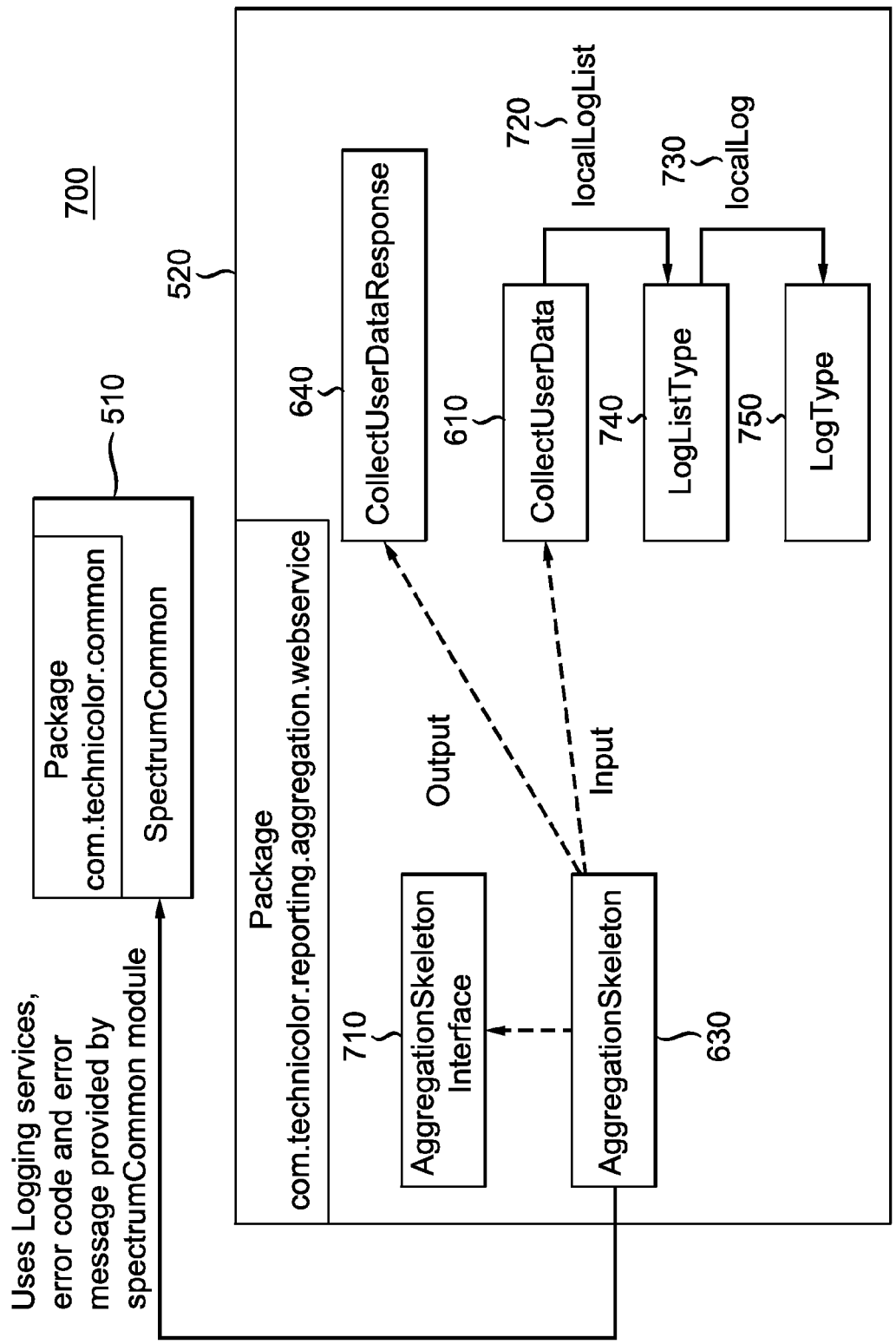
FIG. 7 is a system diagram outlining the inter-workings of an aggregation module in accordance with one embodiment.

FIG. 7 depicts a system 700 showing the intercommunication by the SpectrumCommon Jar 510 and the Aggregation WAR 520. The SpectrumCommon module 510 provides logging services, error codes, and error messages to Aggregation module 520. The aggregation skeleton 620 using the aggregation skeleton interface 710 receives a CollectUSerData request 610 and parses through the LocalLogList 720 and LocalLog 730 for LogListType 740 and LogType 750. A response 640 to the CollectUserData request is then returned.

The following user activities in the Flash/Flex applications can be logged:

| Application User Activity | Parameters |
| --- | --- |
| Application start<br>Notes: Use same message for Spectrum shell start, Spectrum app start, and $3^{rd}$ party application start | Timestamp<br>HouseholdId<br>UserId<br>DeviceId<br>SessionId<br>ApplicationId<br>ItemId<br>ItemType (VOD, TV_PROGRAM, APP, CLIP, other types TBD) |
| Application end<br>Notes: Use same message for Spectrum shell start, Spectrum app start, and $3^{rd}$ party application start | Timestamp<br>HouseholdId<br>UserId<br>DeviceId<br>SessionId<br>ApplicationId |
| Screen saver start | Timestamp<br>HouseholdId<br>UserId<br>DeviceId<br>SessionId<br>ApplicationId |
| Screen saver end | Timestamp<br>HouseholdId<br>UserId<br>DeviceId<br>SessionId<br>ApplicationId |
| Acquire | Timestamp<br>HouseholdId<br>UserId<br>DeviceId<br>SessionId<br>ApplicationId<br>ItemId<br>ItemType (VOD, TV_PROGRAM, APP, CLIP, other types TBD)<br>OfferId<br>ProviderId (YOUTUBE, NETFLIX, NSP, other types are TBD)<br>AcquireSource (SEARCH, RECOMMEND)<br>AcquireType (BUY, RENT)<br>Price<br>Currency<br>Status (SUCCESS, FAIL, CANCEL) |
| Search | Timestamp<br>HouseholdId<br>UserId<br>DeviceId<br>SessionId<br>ApplicationId<br>Search term |
| Share<br>Notes: This is a separate activity message instead of using User Action message since friendId parameter is needed. | Timestamp<br>HouseholdId<br>UserId<br>DeviceId<br>SessionId<br>ApplicationId<br>ItemId<br>ItemType<br>FriendId |
| UserAction<br>Notes: This message is used for common user activities (rate and social messaging) that can be accessed from multiple places in the application and which don't require additional message parameters. | Timestamp<br>HouseholdId<br>UserId<br>DeviceId<br>SessionId<br>ApplicationId<br>ItemId<br>ItemType (VOD, TV_PROGRAM, APP, CLIP, other types TBD)<br>ActionType (RATE, SOCIAL_MESSAGE, etc) |
| ManageLibrary | Timestamp<br>HouseholdId<br>UserId<br>DeviceId<br>SessionId<br>ApplicationId<br>ItemId<br>ItemType (VOD, TV_PROGRAM, APP, |

| Application User Activity | Parameters |
|---|---|
| | CLIP, other types TBD)<br>ActionType (ADD_COLL, DELETE_COLL, ADD_COLL_ITEM, DELETE_COLL_ITEM) |
| ManageFriend | Timestamp<br>HouseholdId<br>UserId<br>DeviceId<br>SessionId<br>ApplicationId<br>Action (ADD, DELETE, ACCEPT_INVITE, SEND_INVITE, SEARCH, other types TBD) |
| Mirror (throw to TV) | Timestamp<br>HouseholdId<br>UserId<br>DeviceId<br>SessionId<br>ApplicationId<br>ItemId<br>ItemType (VOD, TV_PROGRAM, APP, CLIP, other types TBD)<br>Content position |
| FileDownload (3$^{rd}$ party apps) | Timestamp<br>HouseholdId<br>UserId<br>DeviceId<br>SessionId<br>ApplicationId<br>ItemId<br>ItemType (VOD, TV_PROGRAM, APP, CLIP, other types TBD) |

DVR activity may also be logged. This includes:
  Key presses on the remote control
  DVR recording management

| DVR User Activity | Parameters |
|---|---|
| Play | Timestamp<br>HouseholdId<br>UserId<br>DeviceId<br>SessionId<br>ApplicationId<br>DeviceType (TABLET, TV)<br>ItemId<br>ItemType (VOD, TV_PROGRAM, APP, CLIP, other types TBD)<br>ProviderId (YOUTUBE, NETFLIX, NSP, other types are TBD)<br>Content position |
| Pause | Timestamp<br>HouseholdId<br>UserId<br>DeviceId<br>SessionId<br>ApplicationId<br>DeviceType (TABLET, TV)<br>ItemId<br>ItemType (VOD, TV_PROGRAM, APP, CLIP, other types TBD)<br>Content position |
| Fast forward | Timestamp<br>HouseholdId<br>UserId<br>DeviceId<br>SessionId<br>ApplicationId<br>DeviceType (TABLET, TV)<br>ItemId<br>ItemType (VOD, TV_PROGRAM, APP, CLIP, other types TBD)<br>Content position |
| Reverse | Timestamp<br>HouseholdId<br>UserId<br>DeviceId<br>SessionId<br>ApplicationId<br>DeviceType (TABLET, TV)<br>ItemId<br>ItemType (VOD, TV_PROGRAM, APP, CLIP, other types TBD)<br>Content position |
| Stop | Timestamp<br>HouseholdId<br>UserId<br>DeviceId<br>SessionId<br>ApplicationId<br>DeviceType (TABLET, TV)<br>ItemId<br>ItemType (VOD, TV_PROGRAM, APP, CLIP, other types TBD)<br>Content position |
| ViewTVStart | Timestamp<br>HouseholdId<br>UserId<br>DeviceId<br>SessionId<br>ApplicationId<br>ChannelId |
| ViewTVEnd | Timestamp<br>HouseholdId<br>UserId<br>DeviceId<br>SessionId<br>ApplicationId<br>ChannelId |
| ManageDVRRecording | Timestamp<br>HouseholdId<br>UserId<br>DeviceId<br>SessionId<br>ApplicationId<br>ItemId<br>ItemType (VOD, TV_PROGRAM, APP, CLIP, other types TBD)<br>Action (DELETE, SAVE_UNTIL, other types TBD) |

An example of a transaction using a CollectUserData JSON Request can be seen below:

```
{
  "userLog":{
    "authToken":"?",
    "logs":[
      {
        "log":"2010-10-12 16:52:12.014|Household123|be01|
          dev456|Sess123|
App001|ACQUIRE|ITEM_ID:987;ITEM_TYPE:VOD;
OFFER_ID:Offer123;PROVIDER:NETFLIX;
ACQUIRE_SOURCE:SEARCH;ACQUIRE_TYPE:BUY;PRICE:7.99;
CURRENCY:USD;STATUS:SUCCESS;"
      },
      {
        "log":"2010-10-12 16:52:12.014|Household123|be01|
          dev456|Sess123|
App001|ACQUIRE|ITEM_ID:987;ITEM_TYPE:VOD;
OFFER_ID:Offer123;PROVIDER:NSP;
ACQUIRE_SOURCE:SEARCH;ACQUIRE_TYPE:RENT;
PRICE:2.99;CURRENCY:USD;STATUS:SUCCESS;"
      }
    ]
  }
}
```

An example of a CollectUserData JSON Response is:

```
{
    "status":"true"
}
```

Figure 8:
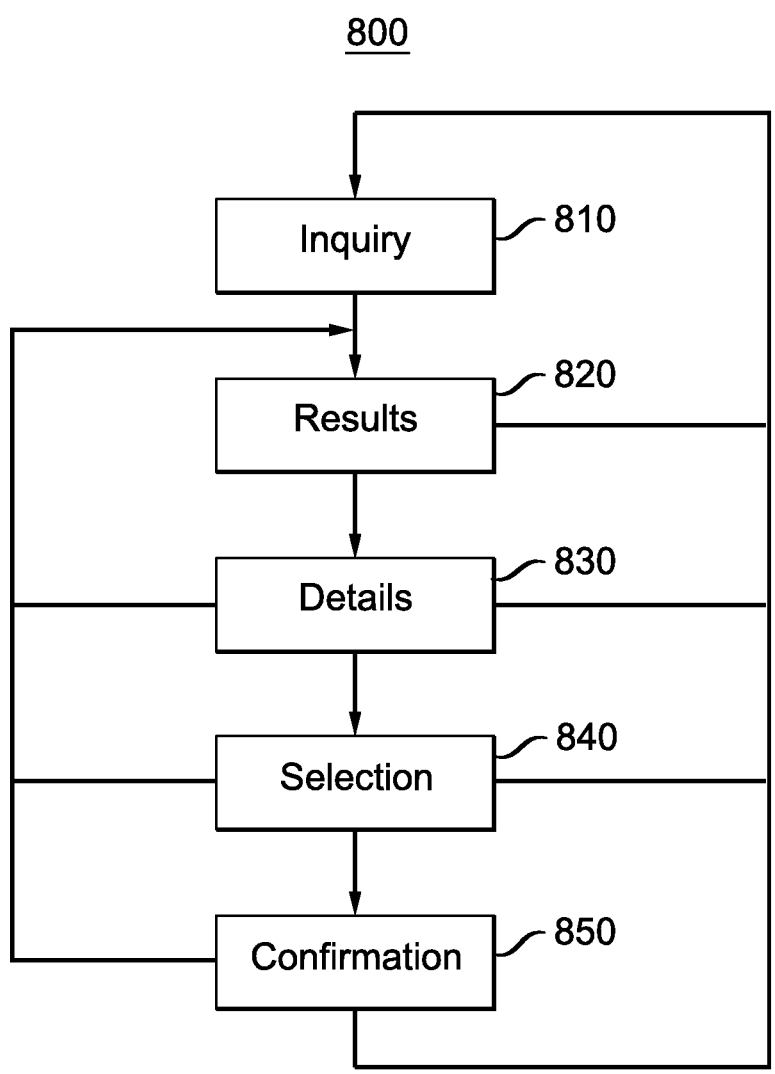
FIG. 8 is a flow diagram depicting an exemplary process in accordance with one embodiment.

One concept used in the collection of user data is that of a "session." A "session" is a collection of actions by a user that make a particular interaction between the user and the device. For example session may include all the action a user took to watch a particular piece of media. FIG. 8 provides a flow chart 800 of one example of the process a session can involve.

In FIG. 8, there are five stages or steps to a session 800. These stages are inquiry in step 810, results in step 820, details in step 830, selection in step 840, and confirmation in step 850. Each of these stages will be discussed in more detail below.

The inquiry stage (step 810) initiates the session. The inquiry stage can be thought of as analogous to the beginning of a users interaction with the device in which the user seek to answer the question "what is can I watch." For example, an inquiry may be a search on a particular topic, a request for listing of VOD offerings, a request for an EPG, or a request for listing of previously recorded programs. Any such activity starts the session and is logged as part of the session.

In response to the inquiry step (step 810), results are provided for the user to review (step 820). The results could be the results of the search performed, the listing of available VOD offerings, the EPG, or the listing of previously recorded programs. The results can also include recommendations based on the user or device. In other embodiments the results provided can be filtered based on the user or device. The results provided to user are logged as part of the session. Based on the provided results the user can make a new inquiry (step 810) beginning a new session or get additional details (step 830) about the provided results.

The details stage (step 830) involves the user being provided with and reviewing additional information about the provided results (step 820). The additional information can be plot summaries, cast and crew listings, ratings, etc. The additional information may also include trailers, video clips, and special promotional listings and offers. Again the additional information viewed by the user is logged as part of the session. After reviewing the additional information for a result the user may then make a new inquiry (step 810), review other results (step 820) or make a selection (step 840).

The selection stage (step 840) involves the choice of content by the user to watch. This may be a currently playing program, a VOD offering, downloadable content, a program previously recorded, or the like. When content is selected the user is then informed of what is necessary to view the content such as tuning the particular channel, starting the stream, starting the download, playing back from the recoding, as well as any pricing or purchasing information. This selection is logged as part of the session. The user again has the option of performing a new inquiry (step 810), returning to the results (step 820) or confirming the selection of the content (step 850).

Confirmation (step 850) involves the actually acquisition of the content including purchasing, tuning to the channel, downloading, etc. This is also where the user agrees to the terms in order to view the selected content. Any agreement to terms and acquisition is logged as part of the session and also concludes the session.

Referring again to FIG. 4, once usage data is collected (step 410), the usage data is provided to the back end where it can be processed (step 420) to build a user profile. The use of sessions allows for the tracking of not just content selection but the path pursued to arrive at the content selection. Thus it can be determined what inquiries, results, details, and acquisition requirements result in selection and consumption of content as well as what inquires results, details and acquisitions requirement can prevent the selection and consumption of content. By knowing what the user selects for viewing as well as how the user arrived at the selection, feedback can be provided (step 430) to evaluate the effectiveness of searches, recommendations, additional information, and pricing in the section of content by the user. The feedback may also be used to improve each stage of an acquisition session.

For example, results and recommendations, additional information, and acquisition requirements such as cost or rental terms can be adjusted in future session to improve "buy" selections by the user. Likewise this information can be used to improve targeted advertising, including special offers. Other possible uses for the techniques discussed herein include.

1. Deciding where a user should be shown selections. For example, it can be more likely that a user will end up buying VOD programming based on a suggestion made by the personalization engine, instead of the media asset being advertised at the bottom of an EPG banner advertisement.
2. Changing the order in which results in a search are made based on the tracking information. For example, a search result from IMDB may be acted on more frequently by a user than a search result from Amazon. Also, the order of search results can be monitored where a user may have a particular preference for an order of credits such as having an actor field placed before a director field, and the like.
3. Understanding the type of content a user seems to gravitate towards (for example, action movies with cars, airplanes or travel programming with beaches, etc. . . . ) to provide a level of relevancy in content offerings and also up-sell services that range from premium programming (pay channels) to physical merchandize (a Ferrari F-40 model vehicle).
4. Trending the purchase history of content for users and comparatively view other users in a peer group to, for example, track both the user and the peer group's reactions to marketing strategies. For example, a peer group in Beverly Hills may react favorably to a platinum tier programming package at $29.99 compared to a group elsewhere that maybe more interested in the same or slightly variant package at $12.99. Pricing effectiveness of marketing strategies can be measured on an individual basis as well. For example:
    A. User searches for Iron Man. Not currently available but user is proved with offer to purchase the latest Spiderman movie for $30, to rent the Hulk (circa 2008) for $6, or to rent the Hulk (circa 2003) for $4.00. User selects to rent Hulk (circa 2008). Purchase data is stored that may (along with other tracked data) indicate the user's tendency to rent rather than buy and/or desire to view movies associated with the upcoming Avengers movie (circa 2012).

B. Tracking when a user is more likely to rent or purchase. For example, a user's consumption habits may reveal that the user is 80% more likely to rent a movie but 75% more likely to purchase a TV episode. This information can be used to shape future offers to the user.

C. Tracking and analyzing price resistance. Assisting content provider in understanding user's decision making (i.e., was it the price of the movie or was it the time of day). Offer the same movie at different prices and different times of day to assist content provider in setting price for movie and understanding what caused purchase.

5. Provides a portal that bridges broadcast, VOD, over the top and user generated programming. As a result, the industry can be provided with first programming measurement capabilities and effectiveness across the multiple sources of available content. That is, the research and the preference engine will go between applications and services which typically are not monitored (i.e., user spends 20% of their time watching TNT, 30% on Yahoo.com, 50% of their time watching Hulu.com).

6. May push user to a different source of the same content based on the user subscription. For example, User A may have a premium subscription ($150 a month) and User B may just have a basic subscription ($45 a month). If desired content (e.g., recent movie) is available both on a premium movie channel and on VOD, the system of the present disclosure would direct User A to the premium movie channel and User B to VOD. This would at least reduce the risk of User A dropping the premium subscription because the user is repeatedly directed to VOD offerings.

8. Methodology behind periodically reminding the user of what movies and television shows are stored in the digital locker. The system can remind the user that they already have such content archived on their personal locker. For example:

A. Consider possibility of having the reminder be that the content is available in a second person's digital locker (my wife has her own digital locker and I want to access the content in the locker).

B. Making available through other people's lockers, content that can be freely distributed (home movies, YouTube content, etc.)

9. Tracking when a user repeatedly rents and views a movie and offering the user the option to buy the same movie or a related movie. For example:

A. Consider a model where the more the user has rented a movie, the less costly the movie rental becomes until the user has paid for it enough times that it gets uploaded to their digital locker for free.

B. Consider also the idea that if there is a series of movies to be rented, the first movie rented (Godfather I) is 5.00, (Godfather II) is 3.00, (Godfather III) is 1.00. This option can also apply for buying programs in a series (first episode 3.00, $2^{nd}$ episode 2.00, $3^{rd}$ 1.00).

10. Track users' use of recommendations. For example, user A may be 35% more likely to follow a friend's recommendation as opposed to a recommendation from a recommendation engine and User B may be 40% more likely to follow a recommendation from a recommendation engine as opposed to a friend's recommendation. The system can track this behavior and use it to prioritize recommendations made to different users.

11. Track explicit ratings (user given rating "4 stars") and implicit ratings (number of views, number of times given scenes are viewed, number of times user recommends content to friends, etc.) to determine what is recommended to a user. For example, a user gives Rocky a 5 star rating but only views Rocky once and never recommends the movie to a friend. The same user gives Ghostbusters a 2 star rating but views the movie in its entirety 3 times, a particular scene in the movie 9 times, and recommends the movie to 10 friends. Based on this history, Ghostbusters 2 would be recommended to the user before recommending Rocky 2.

This concept considers the idea that people do not rate movies fairly, where a 5 star movie may not really be 5 stars for everything. Therefore, one has to consider the actual interaction a user has with a media asset aside for the explicit rating that is given to the asset. It should be noted that different algorithms can be developed to determine ratings by using both explicit ratings (what the user rated a media asset) and implicit ratings (how the user interacts with the media asset).

12. Tracking when and where a user views a movie and using this context information to adjust what is offered to the user in different rooms and at different times (e.g., offering different recommendation for viewing in the living room at 1 pm as opposed to the bed room at 9 pm). For example, a user can specify what type of device is being used and where the device is located.

When collecting usage data, an exemplary embodiment of the disclosure focuses on accumulating data concerning the content author of a particular media asset. That is, instead of considering how a user interacted with a specific media asset, there is value for determining at a higher level how a user interfaces with different types of content from a content author. That is, a content author may create different types of content such as movies, computer games, websites, and the like. The content author would therefore want to be able to track a user's consumption of media assets regardless of the form of such assets.

One approach for identifying the creator of media content can be determined from the use of an explicit metadata field which contains such information. In an exemplary embodiment, the field CREATOR_ID (or similar type of field) lists content creator information identifying a studio or production company that made a specific media asset. Implicit techniques can also be used to identify a content creator where metadata associated with a media asset can be mined in order to determine the content creator. For example, if the field CREATOR_ID is blank but there is ID information such ITEM ID, or other type of metadata field (title or copyright information) that can be referenced in a table, database, or other memory whereby the id information can return information for a content creator.

More approaches for identifying a content creator for a media asset when such information is not explicitly defined in a media asset include identifying audio and/or visual watermarks that can reside in a media asset which indicate the attributes of a media asset, determining a media asset's title from electronic program guide information corresponding to the media asset, performing text extraction techniques on teletext, subtitles, or closed captioning that accompanies a media asset to identify such an asset, and these like. Once a media asset is identified the identifying information can be looked up in a table, database, storage medium, search engine, and the like where the results of such a look up returns the identity of the media asset's creator.

Another approach that can be applied for media assets which are accessed directly through websites would analyze the Uniform Resource Indicator (URI) associated with a media asset and determine if the URI has any identifying information that can be used to determine a content author. For example, a URI that has www.disney.com/xxxx/xxxx could reference the domain name in the root of the URI "Disney" which indicates the media asset is associated with Disney as a content creator. This type of consideration can also be performed when a URI consists of an IP address that can be resolved into a domain name using a Domain Name Server (DNS) whereby a content author can be extracted from the resolved domain name. A further approach links a series of domain names to a content creator, for example, the domain names of www.e.com, www.comcast.com, www.nbc.com are all linked to the content creator Comcast, where a domain name is referenced and content creator information can be returned.

Determining a content creator for a corresponding media asset can be performed when analyzing a user's activity on a social network. When various messages are communicated from a user to a social media website or service such as FACEBOOK or GOOGLE+, the user may have comments concerning a particular media asset. Usage data can be collected from such messages by performing a keyword search for titles that correspond to media assets. Such titles can then be matched against a table, database, storage device, and the like to determine a content creator that corresponds to a media asset. Alternatively, some social media network architectures provide a system for a user to "post" information about a media asset directly to the social media network which can use information such as ITEM ID or other type of identifier to identify an asset. The identifying information can be resolved to return content creator information in a manner as disclosed in accordance with the exemplary embodiments disclosed herein.

One problem with resolving social networking information is that information such as minutes of usage will not be part of a post or a comment because a user is describing a media asset instead of having a metric which directly measures a user's consumption of such a media asset. An exemplary embodiment of the present disclosure can assign a value, such as X minutes of consumption (X being an numeric value), for each posting that a user makes about a user asset to a social media network, where such a value can be aggregated with other measurable values concerning how long or how many times a media asset is consumes. For example, if a user watches a media asset for 30 minutes and posts two messages about the media asset to a social media network, the usage data for the media asset can be resolved to be a total of 40 minutes (30 minutes for the viewing time and plus 10 minutes for the social media postings if each posting resolves to be 5 minutes of viewing time). Optionally, a lock out period can be instituted for postings to a social network where Y minutes (Y being a numeric value) must lapse between two postings about the same media asset before both postings count as usage data. If the amount of time between the two postings is less than Y minutes, then only one posting will be counted.

Figure 9:
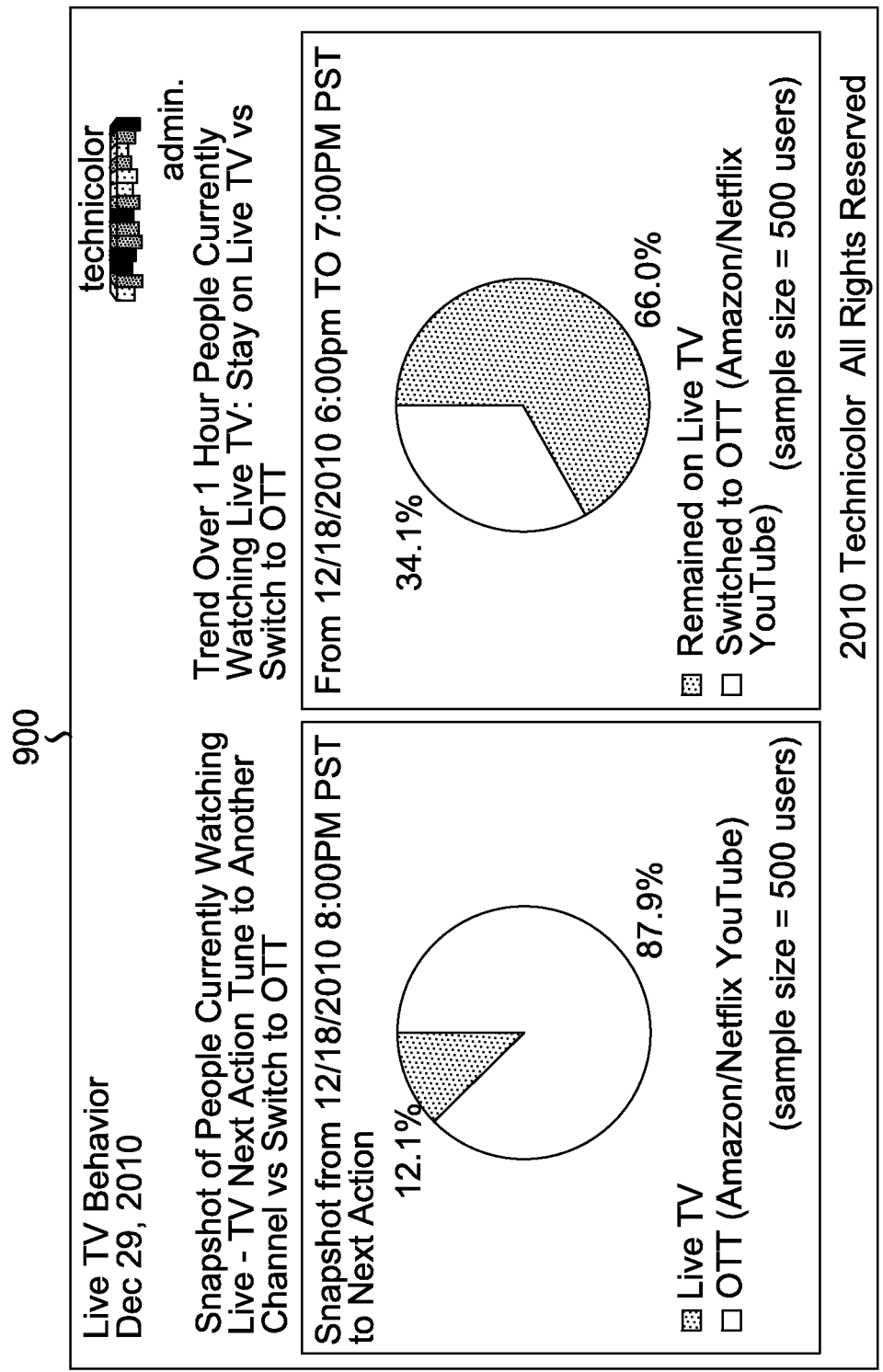
FIG. 9 is a diagram depicting a usage data report in accordance with one embodiment.

In the generation of reports from the various usage data listed above, FIGS. 9-12 show various exemplary embodiments on such reports that can be generated. FIG. 9 discloses a report 900 that shows an activity or service that a user will select after engaging in a first activity. For example, the report generated shows a percentage of users that select an over the top (OTT) service such as Amazon, Netflix, YouTube and the like, after watching Live TV. Note, the report generated can be for a specific time of day, interval of time, and the like. In the aspects shown in FIG. 9, the report indicates that for people who watch Live TV for more than an hour, how many people stay with Live TV compared to the number of people who switch to OTT services.

These principles can be expanded to any activity that can be monitored such as viewing live television viewing, viewing PVR or DVR, playing interactive video games, click through with advertisements, browsing the web, purchasing content, using trick play functions, searching for content, switching between various media services or channels, social network activity, and the like. Likewise, the information for time intervals can be done by time of day or specific time intervals where such information can be broken out for a single user, group of users, a demographic of users, user location, user income, user name, and the like.

Figure 10:
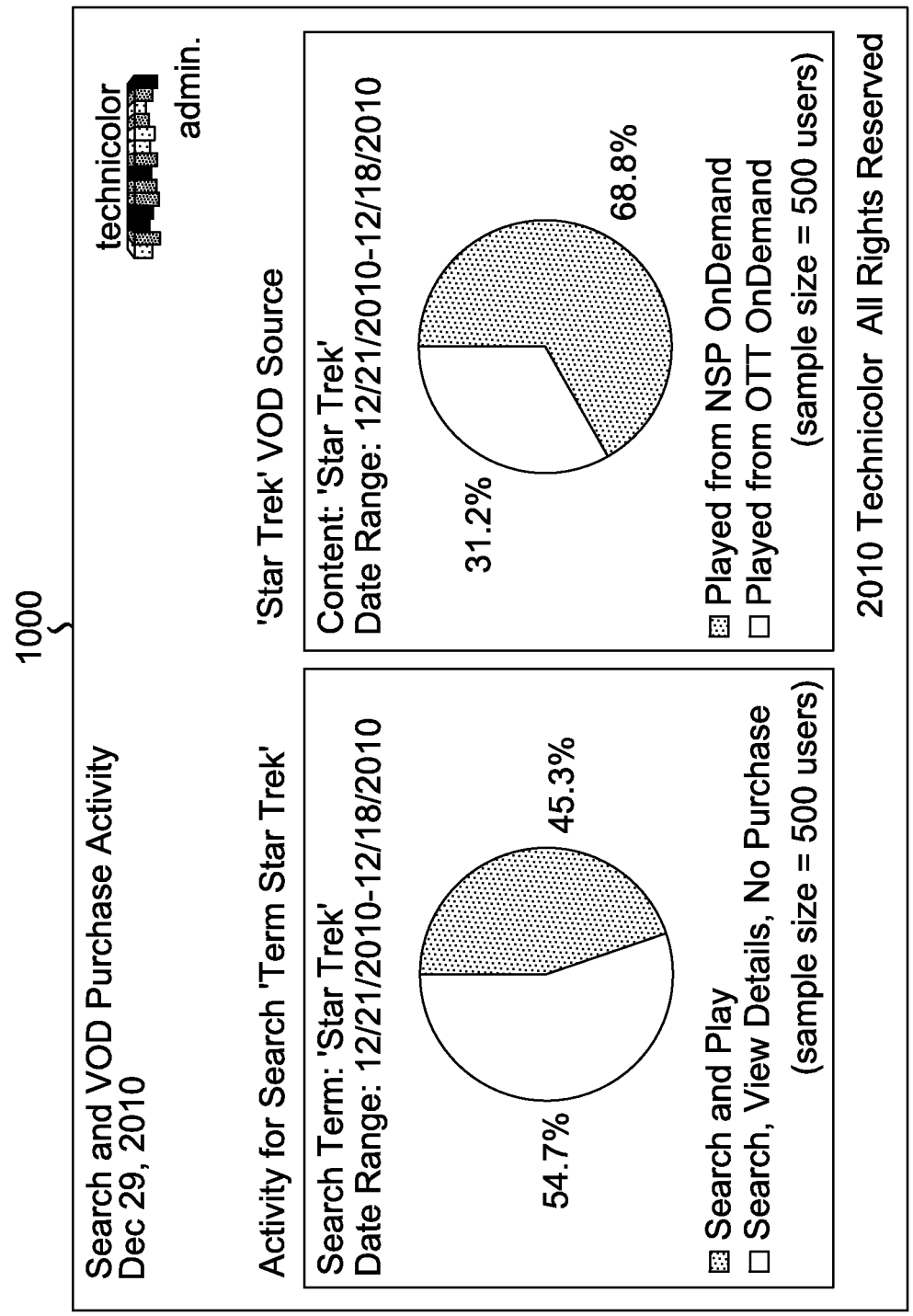
FIG. 10 is a diagram depicting a usage data report in accordance with one embodiment.

FIG. 10 is an exemplary embodiment of a report 1000 that is related to "click through" or how successful is a purchase of content in response to an initial activity. For example, if a user searches for specific content using a search query term during a specific time interval, the report shows whether or not the users played back, did not playback, or purchased the asset. FIG. 10 also shows the source in which a media asset was acquired from and whether or not the media asset was played back. In the first case, the asset came from a Network Service Provider. In the second case, the asset came from an Over the Top service provider. Other sources of where media assets (as well as commercials and/or other types of advertisements) can be reported in accordance with the principles of the present disclosure.

Figure 11:
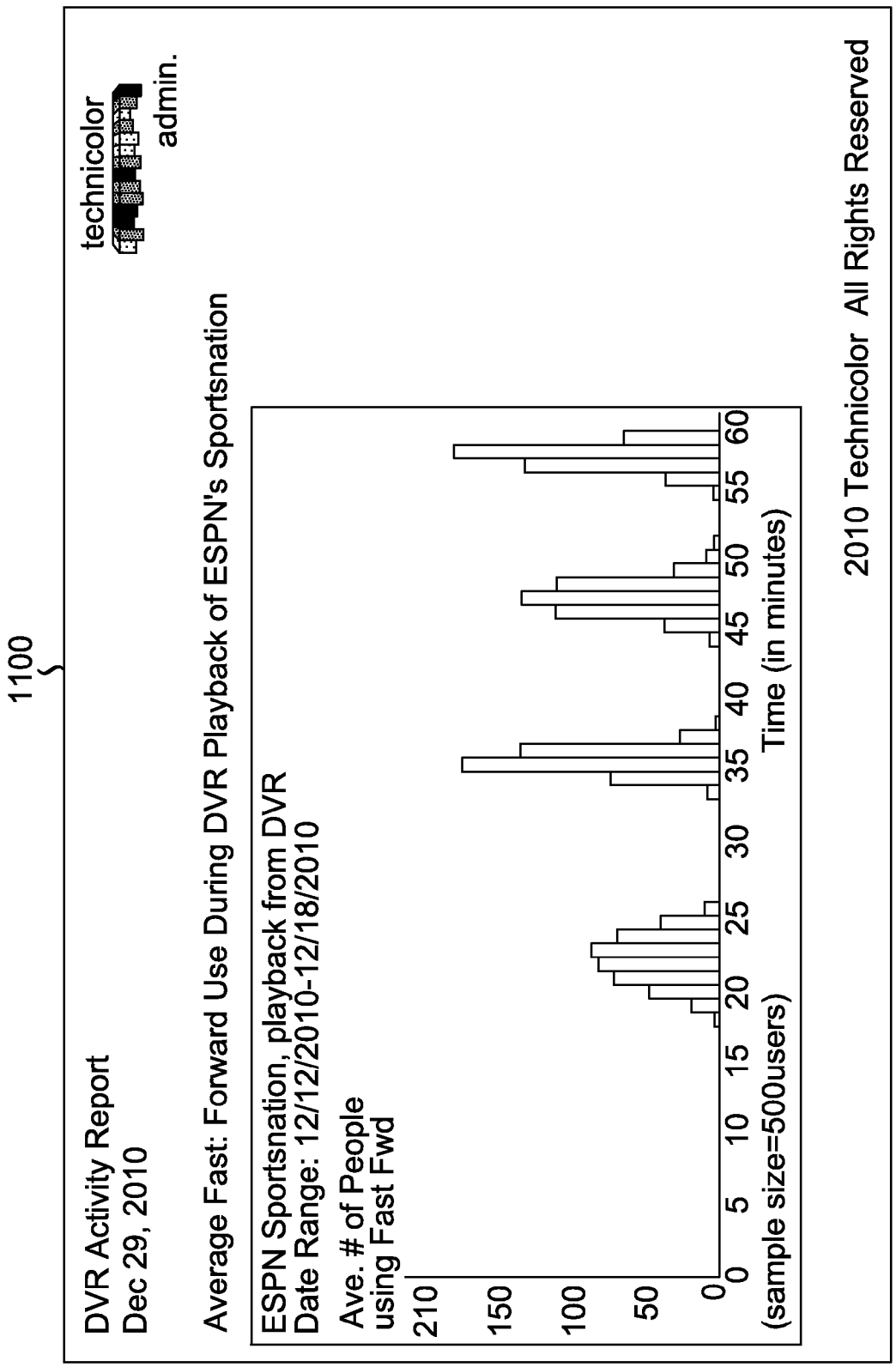
FIG. 11 is a diagram depicting a usage data report in accordance with one embodiment.

FIG. 11 is an exemplary embodiment of a report 1100 concerning how a user engages trick play for a specific media asset. For example, when watching ESPN, the report shows during what time segment of a television show that users engaged in a trick play function (such as fast forwarding). Although the report is for a specific television show that is stored on a DVR, the following scenarios are possible for different television shows (although other media assets can be monitored in a similar way) and networks and a user's use of trick play and/or how frequently a user switches channels:

A report can be generated for a television show in real time, where a user's switching of channels during specific time segments can be tracked.

A report can be generated for a television show that is stored on a PVR tracking trick play functions against time segments.

A report can be generated for a television show which is being delivered in a streaming video or on-demand modality, where the report could track of all of the trick play behavior.

A report can be generated for a television show that aggregates all user behavior regardless of the source. In this example, the behavior to when a user switches channels for a program when it is being played live can be aggregated with the time segments fast forwarded for the same show when it is delivered from a PVR, DVR, and/or VOD source. Such information can then be overlaid over each other to generate a comparison how a user interacts with a media asset that is delivered in a live setting versus how a user interacts with the same media asset when time shifted.

A report can be generated for specific networks which show how a user interacted with specific host of networks. For example, one can track how a user interacted with all of the live programming in a specific network group such as ESPN compared to all of the live programming in a different group of channels such as HBO.

A report can be structured by using various usage data described herein with corresponding content creator information to group different broadcasters together. For example, the ESPN group comprises of different ESPN branded channels such as ESPN, ESPN2, ESPN College, ESPN News, and the like. Likewise, the HBO comprises different HBO branded channels such as HBO1, HBO2, HBO3, HBOHD, and the like. This type of report can count for a time interval all of the HBO channels that were watched by a user versus all of the ESPN channels.

An exemplary embodiment can be expanded to then include non-live television assets that either ESPN or HBO makes available. For example, for ESPN, this can include going to an ESPN web site, accessing an ESPN streaming or an over the top service, accessing archived ESPN source material on a PVR, DVR, and the like. Similar examples exist for HBO as well. The report can then include all of the HBO assets versus all of the ESPN assets that were accessed for a specific time interval. This example can be further expanded to NSP, OTT, and other network groups. For example, with the ESPN example, a content creator such as Disney, who provides sports and kids content, can be interested in all of the material accessed in their ecosphere whether or not it is from ESPN, ABC, ABC Family, Disney Channel networks, VOD servers, Disney Based websites, Disney Based interactive games, and other possible sources. One can then monitor how a user responds to all of the media assets within a content creator's domain (e.g., all of the web, internet, stored content, live broadcast content supplied by a content creator). That is, when a user switches from one type of media asset to a second type of media asset (television show to web page, television show, interactive game, etc.) are they staying with content provided by a specific content creator (such as DISNEY) or does the user change to content from a second content creator (e.g., FOX or VIVDENDI).

Figure 12:
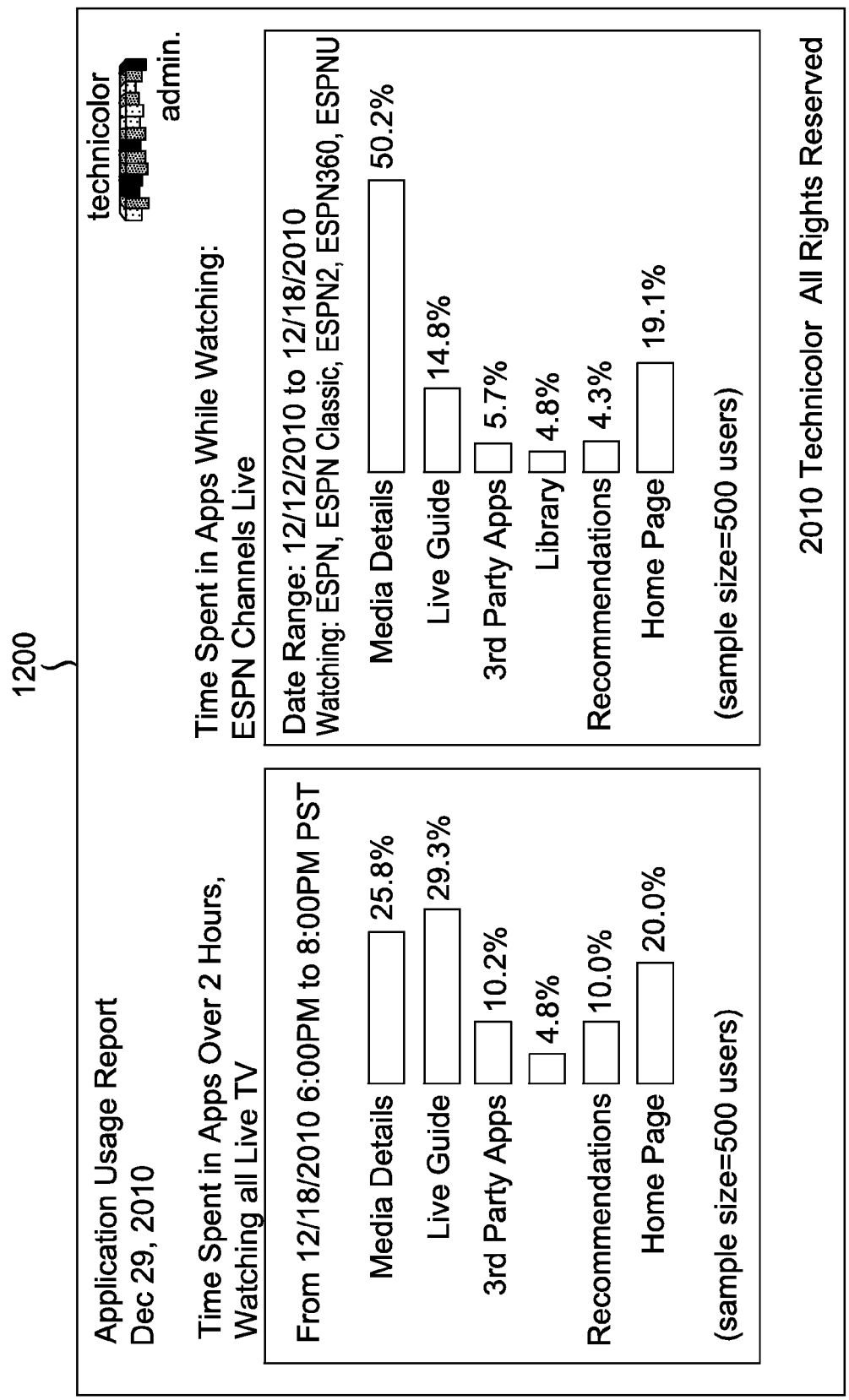
FIG. 12 is a diagram depicting a usage data report in accordance with one embodiment.

FIG. 12 is an exemplary embodiment of a report 1200 that breaks down of all of the different applications that a user (or group of users) has engaged in using a device such a tablet as a second screen or input device while watching live television for a specific time interval. Such activities performed on the second screen device include looking media details information, details of programming in an electronic program guide, using third party applications on the input device, accessing selections on a user library, looking at recommendations made by an application or other users, accessing a user's home page, and the like. The same type of report can be generated for a specific time range when watching a specific television show, network group, and the like.

Figure 13:
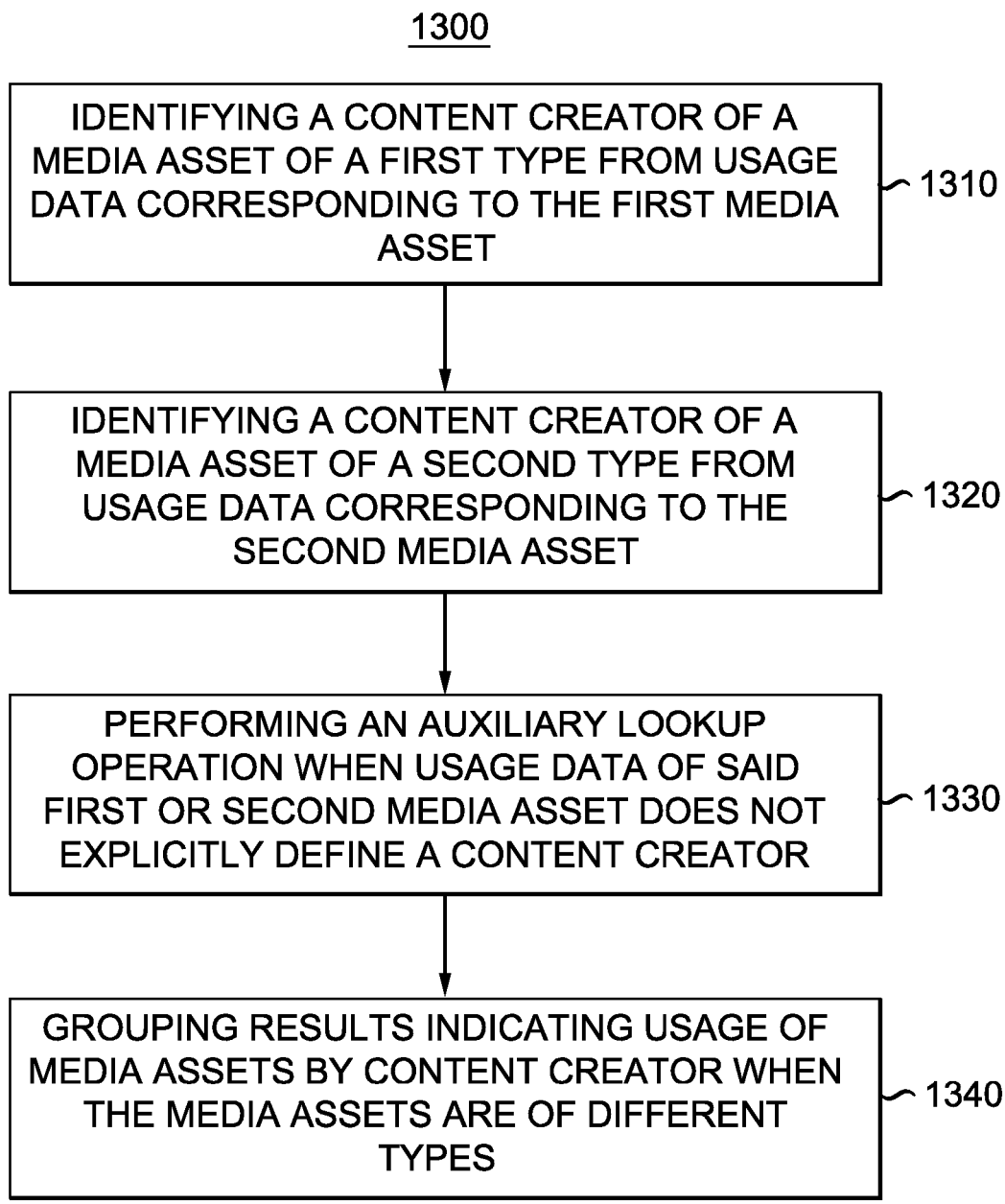
FIG. 13 is a flow diagram depicting an exemplary process in accordance with one embodiment.

FIG. 13 is an exemplary embodiment of method 1300 for determining what content creator is associated with a particular media asset. In step 1310, a computer or other type of processing device in accordance with the exemplary embodiments described identifies a content creator of a media asset of a first type where the identification can be made explicitly from a metadata field as CREATOR_ID. Step 1320 performs a similar operation where a second media asset of a second type is identified from a metadata field. It is anticipated that the media assets are of different types where, for example, the first media asset is a computer game while the second media asset is a video that is delivered from a video on demand server. Other media asset types are accounted for by presently described exemplary embodiments.

In step 1330, a first and/or second media asset has a content creator identified by using a lookup technique where the content creator is not directly identified in the metadata associated with a media asset. Such techniques are described in various exemplary embodiments including domain name lookups, title look up, keyword extraction, and the like. In step 1340, the results of the preceding steps can be grouped together to indicate the usage of media assets by content creator regardless of the type of media assets consumed by a user. These results can be provided in forms according to the described exemplary embodiments. In an optional embodiment, the results are broken down into subheadings according to broadcast networks. For example, for DISNEY as a content creator, media assets can be related to the affiliations of ESPN, ABC, and DISNEY by itself. Hence, a report for the content creator DISNEY, can have all of the assets consumed, regardless of type, pertaining to ESPN be listed under one heading, all of the assets consumed for ABC be under a second heading, and have all of the other assets consumed for DISNEY under a third heading. This approach can be applied to other content creators in accordance with the disclosed embodiments.

While the example set forth above has focused on a system, it should be understood that the present disclosure can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present disclosure in any way, except as set forth in the following claims.

The invention claimed is:

1. A method for determining media asset usage by a computer, the method comprising:
    identifying a first content creator of a first media asset of a first type from first usage data corresponding to the first media asset utilizing the computer;
    identifying a second content creator of a second media asset of a second type from second usage data corresponding to the second media asset utilizing the computer,
    wherein said first type is different from the second type;
    performing a lookup operation to identify a corresponding content creator for at least one of the first media asset or the second media asset upon determining at least one of the first usage data corresponding to the first media asset and the second usage data corresponding to the second media asset fails to identify the corresponding content creator for the at least one of the first media asset or the second media asset; and
    providing results indicating usage of the first and second media assets by the corresponding content creator.

2. The method of claim 1, wherein the first and second content creators are the same entity.

3. The method of claim 1, wherein the first and second content creators are different entities.

4. The method of claim 1, wherein the corresponding content creator is broken down into sub-affiliations.

5. The method of claim 1, wherein the lookup operation determines a content creator from the domain name used to access the at least one of the first media asset and the second media asset.

6. The method of claim 1, wherein the lookup operation determines a content creator from postings about the at least one of the first media asset or the second media asset made to a social networking system.

7. The method of claim 6, wherein a first posting and a second posting about a same media asset are counted as two postings only if a period of time is exceeded between a time the first posting is made and a time the second posting is made.

8. The method of claim 1, wherein the usage data comprises a channel, a time of watching the channel, a duration of watching the channel, and program information associated with the channel.

9. The method of claim 1, wherein the usage data comprises subscriber migratory patterns from a first media source to a second media source and from the first media asset to the second media asset.

10. An apparatus to determine media asset usage, the apparatus comprising:
a processor configured to:
identify a first content creator of a first media asset of a first type from first usage data corresponding to the first media asset;
identify a second content creator of a second media asset of a second type from second usage data corresponding to the second media asset,
wherein said first type is different from the second type;
perform a look up operation to identify a corresponding content creator for at least one of the first media asset or the second media asset upon determining at least one of the first usage data corresponding to the first media asset and the second usage data corresponding to the second media asset fails to identify the corresponding content creator for the at least one of the first media asset or the second media asset; and
provide results indicating usage of the first and second media assets by the corresponding content creator.

11. The apparatus of claim 10, wherein the corresponding content creator is broken down into sub-affiliations.

12. The apparatus of claim 10, wherein the processor determines a content creator from the domain name used to access the at least one of the first media asset and the second media asset.

13. The apparatus of claim 10, wherein the processor determines a content creator from postings about the at least one of the first media asset and the second media asset made to a social networking system.

14. The apparatus of claim 10, wherein a first posting and a second posting about a same media asset are counted as two postings only if a period of time is exceeded between a time the first posting is made and a time the second posting is made.

15. The apparatus of claim 10, wherein the first and second content creators are the same entity.

16. The apparatus of claim 10, wherein the first and second content creators are different entities.

17. The apparatus of claim 10, wherein the usage data comprises subscriber migratory patterns from a first media source to a second media source and from the first media asset to the second media asset.

18. The memory of claim 10, wherein the usage data comprises a channel, a time of watching the channel, a duration of watching the channel, and program information associated with the channel.

19. A memory to determining media asset usage, the memory comprising instructions to:
identify a first content creator of a first media asset of a first type from first usage data corresponding to the first media asset when executed by a processing unit;
identify a second content creator of a second media asset of a second type from second usage data corresponding to the second media asset when executed by the processing unit,
wherein said first type is different from the second type;
perform a lookup operation to identify a corresponding content creator for at least one of the first media asset or the second media asset upon determining at least one of the first usage data corresponding to the first media asset and the second usage data corresponding to the second media asset fails to identify the corresponding content creator for the at least one of the first media asset or the second media asset; and
provide results indicating usage of the first and second media assets by the corresponding content creator.

20. The memory of claim 19, wherein the first and second content creators are the same entity.

21. The memory of claim 19, wherein the first and second content creators are different entities.

22. The memory of claim 19, wherein the corresponding content creator is broken down into sub-affiliations.

23. The memory of claim 19, wherein the lookup operation determines a content creator from the domain name used to access the at least one of the first media asset and the second media asset.

24. The memory of claim 19, wherein the usage data comprises a channel, a time of watching the channel, a duration of watching the channel, and program information associated with the channel.

25. The memory of claim 19, wherein the lookup operation determines a content creator from postings about the at least one of the first media asset and the second media asset made to a social networking system.

26. The memory of claim 25, wherein a first posting and a second posting about a same media asset are counted as two postings only if a period of time is exceeded between a time the first posting is made and a time the second posting is made.

27. The memory of claim 19, wherein the usage data comprises subscriber migratory patterns from a first media source to a second media source and from the first media asset to the second media asset.

* * * * *